US009071024B2

(12) United States Patent
Shinba

(10) Patent No.: US 9,071,024 B2
(45) Date of Patent: Jun. 30, 2015

(54) SHIELD SHELL WITH FIRST AND SECOND ATTACHMENT PIECES

(75) Inventor: Daichi Shinba, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 64 days.

(21) Appl. No.: 14/007,552

(22) PCT Filed: Mar. 19, 2012

(86) PCT No.: PCT/JP2012/001899
§ 371 (c)(1),
(2), (4) Date: Oct. 31, 2013

(87) PCT Pub. No.: WO2012/132308
PCT Pub. Date: Oct. 4, 2012

(65) Prior Publication Data
US 2014/0051283 A1 Feb. 20, 2014

(30) Foreign Application Priority Data
Mar. 25, 2011 (JP) ................................ P2011-067371

(51) Int. Cl.
*H01R 13/648* (2006.01)
*H01R 13/658* (2011.01)
*H01R 13/6596* (2011.01)
(Continued)

(52) U.S. Cl.
CPC ........ *H01R 13/648* (2013.01); *H01R 13/65802* (2013.01); *H01R 13/6596* (2013.01); *H02G 3/0666* (2013.01); *H02G 15/068* (2013.01)

(58) Field of Classification Search
CPC .................. H01R 13/658; H01R 13/65802
USPC ........................ 439/607.01–607.59
See application file for complete search history.

(56) References Cited

U.S. PATENT DOCUMENTS 6,302,739 B1 * 10/2001 Deno et al. ............... 439/607.17
7,182,612 B1 * 2/2007 Immethun .................. 439/108
7,677,911 B2 * 3/2010 Asada et al. ................. 439/271
(Continued)

FOREIGN PATENT DOCUMENTS

| JP | 2009043644 A | 2/2009 |
| JP | 2009-123519 | 6/2009 |
| WO | WO 2010/131772 | 11/2010 |

OTHER PUBLICATIONS

International Search Report mailed Jun. 12, 2013 from the European Patent Office for PCT Application No. PCT/JP2012/001899.
(Continued)

*Primary Examiner* — Chandrika Prasad
(74) *Attorney, Agent, or Firm* — Sughrue Mion, PLLC

(57) ABSTRACT

A shield shell (21) covering a connector housing (11) includes a first attachment piece (23) in contact with a first attached surface (71) of an attached portion (70) having a hole (71a) for the connector housing (11), and a second attachment piece (25) projecting from an end portion (24) of the first attachment piece (23) to an opposite side to the first attached surface (71) and being in contact with a second attached surface (72) of the attached portion (70). The second attachment piece (25) is fastened to the second attached surface (72) so that the second attachment piece (25) is in elastic contact with the second attached surface (72) with an elastic restoring force bringing the first attachment piece (23) into pressure contact with the first attached surface (71).

4 Claims, 7 Drawing Sheets

(51) Int. Cl.
*H02G 3/06* (2006.01)
*H02G 15/068* (2006.01)

(56) References Cited

U.S. PATENT DOCUMENTS

| | | | |
|---|---|---|---|
| 2002/0155756 A1* | 10/2002 | Yoshioka | 439/607 |
| 2007/0090150 A1* | 4/2007 | Conrad et al. | 228/6.2 |
| 2009/0042452 A1 | 2/2009 | Asada et al. | |
| 2009/0126985 A1 | 5/2009 | Aoki et al. | |
| 2010/0112841 A1* | 5/2010 | Yong | 439/271 |
| 2012/0058674 A1 | 3/2012 | Deno et al. | |

OTHER PUBLICATIONS

Written Opinion of the International Searching Authority mailed Jun. 12, 2013 from the Europran Patent Office for PCT Application No. PCT/JP2012/001899.

Remarks Against Written Opinion of the International Searching Authority from the European Patent Office for PCT Application No. PCT/JP2012/001899.

Communication dated Nov. 11, 2014 from the Japanese Patent Office in counterpart application No. 2011-067371.

* cited by examiner

SHIELD SHELL WITH FIRST AND SECOND ATTACHMENT PIECES

TECHNICAL FIELD

The present invention relates to a shield shell configured to cover a connector housing for housing a terminal of a terminal end of an electric wire, and to a shield shell attachment structure including the shield shell and an attached portion to which the shield shell is attached with a fastening member.

BACKGROUND ART

A shield shell attachment structure illustrated in FIGS. 1 and 2 has been proposed as a structure in which a shield shell covering a connector housing for housing a terminal of a terminal end of an electric wire is attached to an attached portion.

FIGS. 1 and 2 are views illustrating the related shield shell attachment structure. FIG. 1 is a perspective view illustrating a related shield shell connector. FIG. 2 is a side view illustrating the related shield shell attachment structure.

As illustrated in FIGS. 1 and 2, a shield shell attachment structure 100 mainly includes: a shield shell connector 110 including a connector housing 111 and a shield shell 121; and an attached portion 170 to which the shield shell connector 110 is attached.

As illustrated in FIG. 1, the shield shell connector 110 includes: the connector housing 111; the shield shell 121 covering the connector housing 111; a rear holder 131 housed inside the shield shell 121; terminals 141 housed in the connector housing 111; and a front holder 151 holding the terminals 141.

The connector housing 111 has a holding lock 114 to be locked to the shield shell 121. The shield shell 121 has screw holes 129 in which screws 160 are inserted.

The shield shell connector 110 configured as mentioned above is assembled as follows. Specifically, as illustrated in FIGS. 1 and 2, with the terminals 141 housed in the connector housing 111, one side of the connector housing 111 is housed in and locked to the shield shell 121 through the holding lock 114, while the other side of the connector housing 111 is fitted in the front holder 151.

Then, as illustrated in FIG. 2, the shield connector 110 thus assembled is fastened and attached to the attached portion 170 by tightening the screws 160 in their respective screw holes 129. Accordingly, a contact pressure is obtained between the shield shell 121 and the attached portion 170, securing the seal performance of the shield connector 110.

In the related shield shell attachment structure 100 mentioned above, the shield shell 121 obtains the contact pressure on the attached portion 170 at four spots on the shield shell 121 at which the tightening forces of the screws 160 are exerted, as illustrated in FIG. 1. For this reason, it is difficult to obtain a contact pressure on the attached portion 170 from the entire shield shell 121.

In this respect, the applicant of the present application has proposed a shield shell attachment structure described in Patent Literature 1 for attaching the entire shield shell to the attached portion with a sufficient contact pressure.

FIGS. 3 and 4 are views illustrating the shield shell attachment structure described in Patent Literature 1. FIG. 3 is a side view illustrating a shield shell described in Patent Literature 1. FIG. 4 is a side view illustrating the shield shell attachment structure described in Patent Literature 1.

As illustrated in FIGS. 3 and 4, a shield shell attachment structure 200 includes a shield shell connector 210 including a shield shell 221 having fixation pieces 223 projecting toward an attached portion 270 and also having an elastic piece 225 configured to be elastically deformed when contacting the attached portion 270.

As illustrated in FIG. 4, the shield shell 221 is attached to the attached portion 270 by laying the fixation pieces 223 on the upper surface of the attached portion 270 and fastening them with screws 260 tightened from above.

When the fixation pieces 223 are fastened to the attached portion 270 by tightening the screws 260 as described, the elastic piece 225, provided on the opposite side to the fixation pieces 223, presses the attached portion 270. Accordingly, a contact pressure on the attached portion 270 can be obtained from the entire shield shell 221.

CITATION LIST

Patent Literature

[PTL 1] Japanese Unexamined Patent Application Publication No. 2009-123519

SUMMARY OF INVENTION

In the related shield shell attachment structure 200 mentioned above, the fixation pieces 223 project toward a wall surface of the attached portion 270 as illustrated in FIG. 3. Hence, the attached portion 270 is provided with screw holes to insert the screws 260 in a direction perpendicular to the thickness direction of the attached portion 270. Then, in order to provide screw holes with diameters fit for the screws 260, the thickness of the attached portion 270 needs to be greater than the diameters of the screws.

Moreover, the fixation pieces 223 are tilted toward the center of the shield shell 221 as illustrated in FIG. 3. Thus, as the tightening forces of the screws 260 are increased, the posture of the shield shell 221 attached to the attached portion 270 is tilted downwardly rightward in FIG. 3.

In contrast, a connector housing (unillustrated) inside the shield shell 221 is not in contact with nor supported on the shield shell 221, and thus the posture of the connector housing is determined by its fitted state to a mating connector housing (unillustrated). For this reason, increasing the tightening forces of the screws 260 does not tilt the posture of the connector housing inside the shield shell 221.

In this respect, the shield shell 221 secures an internal space large enough to avoid interference with the connector housing inside the shield shell 221.

An object of the present invention is to provide a shield shell and a shield shell attachment structure capable of size reduction in the shield shell while securing a contact pressure on an attached portion from the entire shield shell when they are attached to each other.

A first aspect of the present invention is a shield shell attachment structure comprising: a connector housing configured to house a terminal to be electrically connected to an opposed terminal housed in a mating connector housing; a shield shell configured to cover the connector housing; and an attached portion to which the shield shell housing the connector housing is attached with a fastening member, wherein the shield shell includes a first attachment piece in contact with a first attached surface of the attached portion, the first attached surface having a hole to insert the connector housing, and a second attachment piece projecting from an end portion of the first attachment piece to an opposite side to the first attached surface and being in contact with a second attached surface of the attached portion, and wherein the second attachment piece is fastened to the second attached surface with the fastening member so that the second attachment piece is in elastic contact with the second attached surface with an elastic restoring force bringing an attachment surface of the first attachment piece into pressure contact with the first attached surface.

According to the first aspect, the shield shell includes: the first attachment piece in contact with the first attached surface of the attached portion, the first attached surface having the hole to insert the connector housing; and the second attachment piece projecting from the end portion of the first attachment piece to the opposite side to the first attached surface and being in contact with the second attached surface of the attached portion. Accordingly, even when a hole to insert the fastening member is provided in the second attachment piece, the attachment space for the fastening member to be formed in the attached portion can be secured irrespective of the thickness of the first attached surface in the direction coinciding with the penetrating direction of the hole to insert the connector housing.

By fastening the second attachment piece to the second attached surface with the fastening member, a contact pressure on the first attached surface can be secured by the entire first attachment piece.

Since the second attachment piece can be fastened to the second attached surface in a state where the second attachment piece is in elastic contact with the second attached surface, the shield shell can be attached easily to the attached portion.

The shield shell is fastened to the attached portion in such a way that the second attachment piece is in elastic contact with the second attached surface in a state of exerting an elastic restoring force bringing the attachment surface of the first attachment piece into pressure contact with the first attached surface. Hence, the posture of the shield shell with respect to the first attached surface is not changed even when the fastening force of the fastening member is changed. Thus, the shield shell does not interfere with the connector housing even when the shield shell is attached to the attached portion with the fastening member in such a way that a contact pressure on the first attached surface is secured by the entire shield shell (the first attachment piece of the shield shell). Accordingly, the shield shell does not need to be made large.

Accordingly, it is possible to provide a shield shell attachment structure capable of reduction in the size of the shield shell while securing a contact pressure on an attached portion by the entire shield shell when they are attached to each other.

The first angle formed between the first attachment piece and the second attachment piece may be greater than a second angle formed between the first attached surface and the second attached surface, and the second attachment piece may have a fastening hole to insert the fastening member.

A second aspect of the present invention is a shield shell to be attached to an attached portion by tightening a fastening member in a state of covering a connector housing for housing a terminal to be electrically connected to an opposed terminal housed in a mating connector housing, the shield shell comprising: a first attachment piece configured to be in contact with a first attached surface of the attached portion, the first attached surface having a hole to insert the connector housing, and a second attachment piece projecting from an end portion of the first attachment piece to an opposite side to the first attached surface and configured to be in contact with a second attached surface of the attached portion, wherein a first angle formed between the first attachment piece and the second attachment piece is greater than a second angle formed between the first attached surface and the second attached surface, and wherein the second attachment piece has a fastening hole to insert the fastening member for fastening the second attachment piece to the second attached surface.

According to the second aspect, the shield shell includes: the first attachment piece configured to be in contact with the first attached surface of the attached portion, the first attached surface having the hole to insert the connector housing; and the second attachment piece projecting from the end portion of the first attachment piece to the opposite side to the first attached surface and configured to be in contact with the second attached surface of the attached portion. Accordingly, even when a hole to insert the fastening member is provided in the second attachment piece, the attachment space for the fastening member to be formed in the attached portion can be secured irrespective of the thickness of the first attached surface in the direction coinciding with the penetrating direction of the hole to insert the connector housing.

The second attachment piece is fastened to the second attached surface with the fastening member in such a way that the second attachment piece is in elastic contact with the second attached surface in a state of exerting an elastic restoring force bringing the attachment surface of the first attachment piece into pressure contact with the first attached surface. Hence, the posture of the shield shell with respect to the first attached surface is not changed even when the fastening force of the fastening member is changed. Thus, the shield shell does not interfere with the connector housing even when the shield shell is attached to the attached portion with the fastening member in such a way that a contact pressure on the first attached surface is secured by the entire shield shell (the first attachment piece of the shield shell). Accordingly, the shield shell does not need to be made large.

Since the second attachment piece can be fastened to the second attached surface in a state where the second attachment piece is in elastic contact with the second attached surface, the shield shell can be attached easily to the attached portion.

Accordingly, it is possible to provide a shield shell capable of reduction in size while securing a contact pressure on an attached portion by the entire shield shell when they are attached to each other.

DESCRIPTION OF EMBODIMENTS

Figure 1:
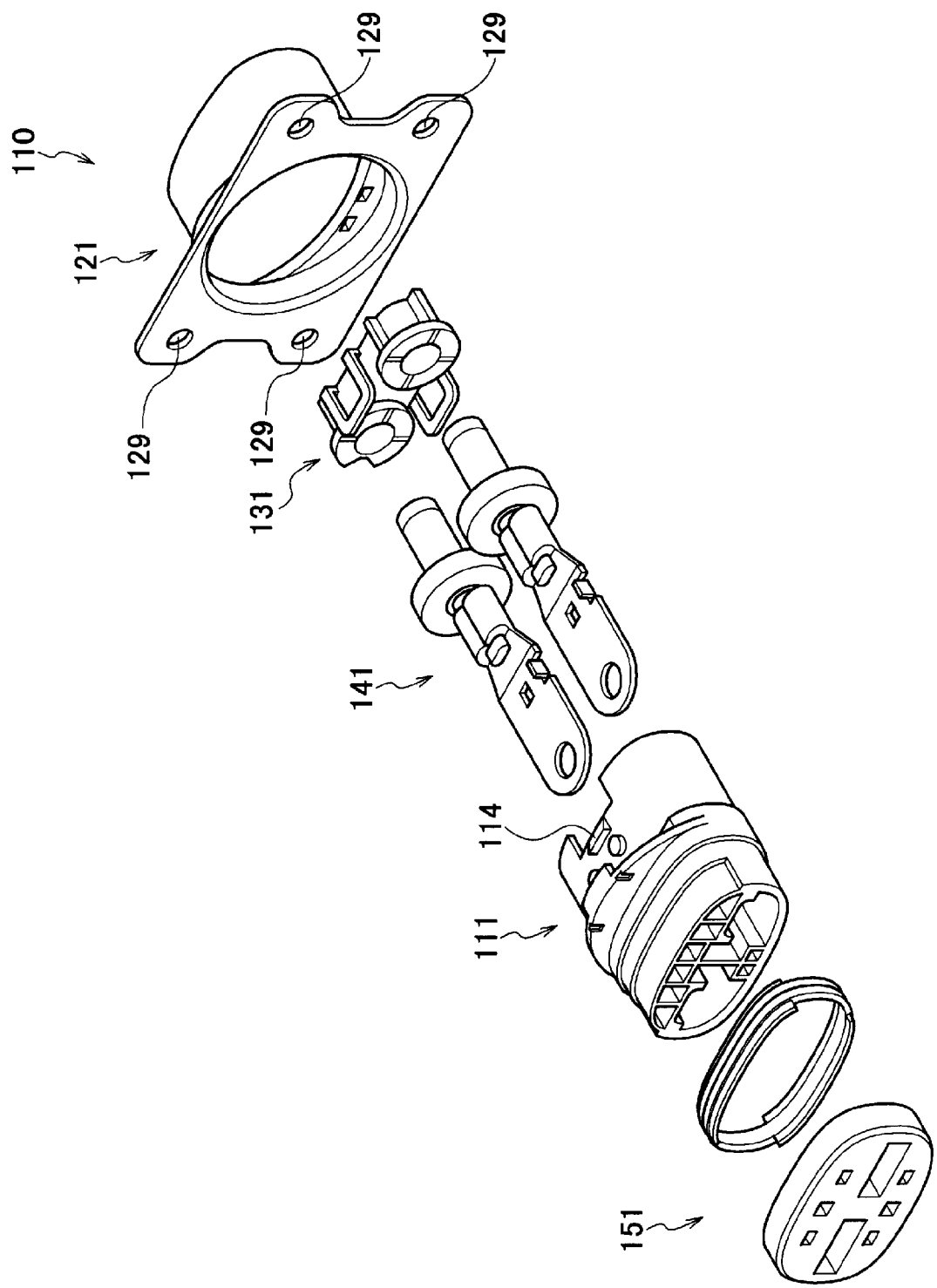
FIG. 1 is a perspective view illustrating a related shield shell connector.
Figure 2:
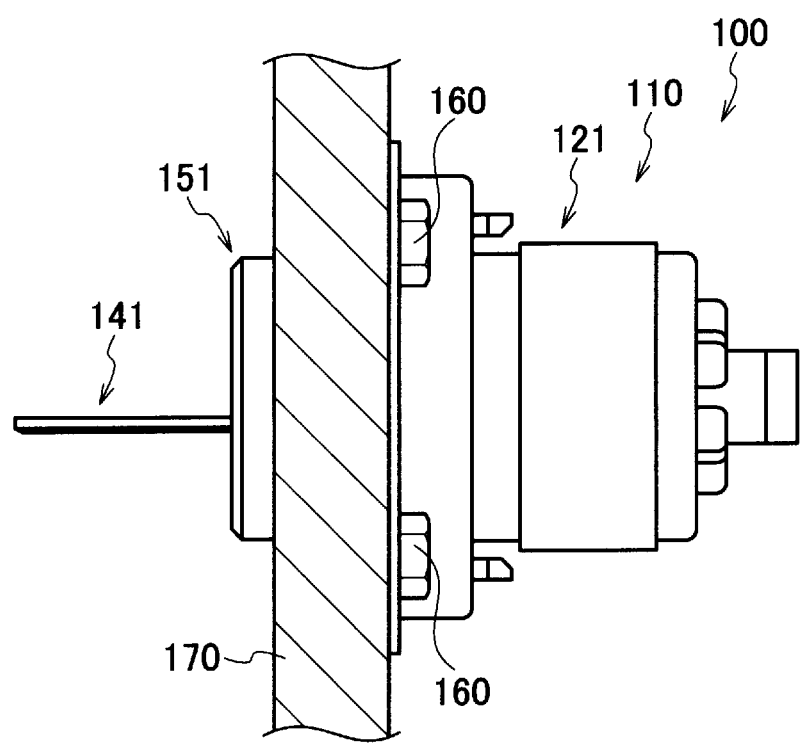
FIG. 2 is a side view illustrating a related shield shell attachment structure.
Figure 3:
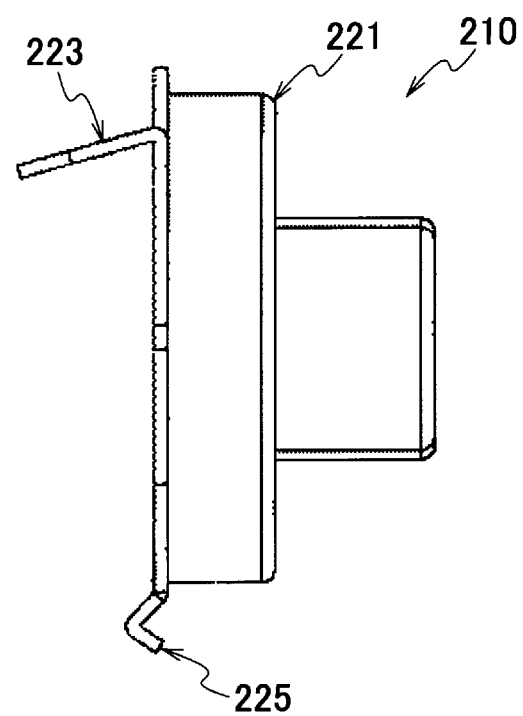
FIG. 3 is a side view illustrating a related shield shell connector.
Figure 4:
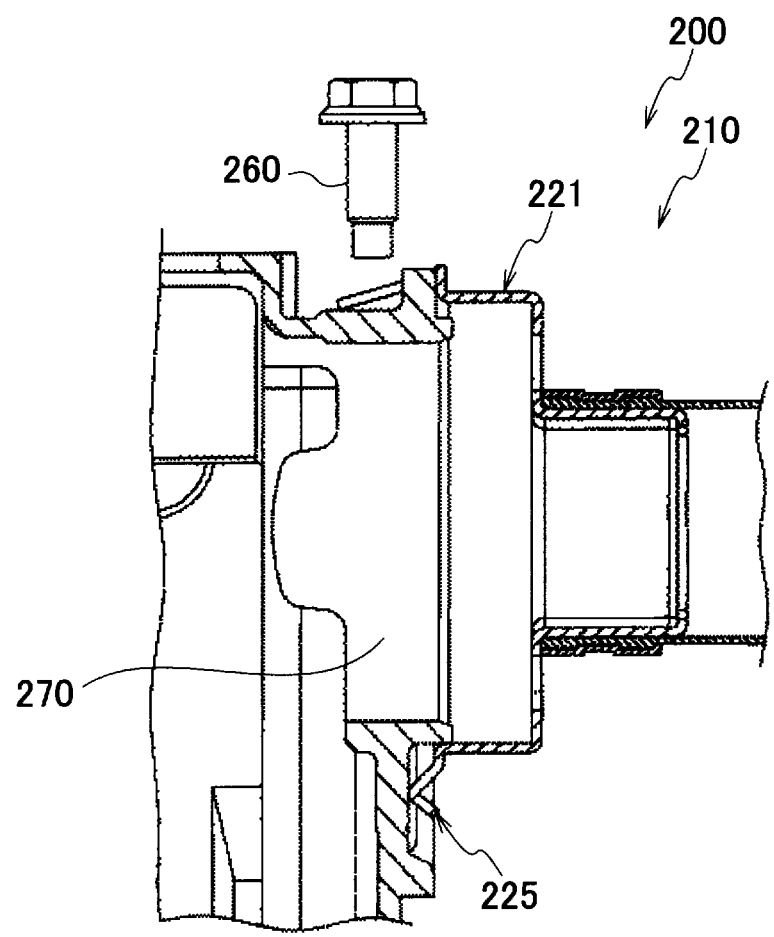
FIG. 4 is a side view illustrating a related shield shell attachment structure.
Figure 5:
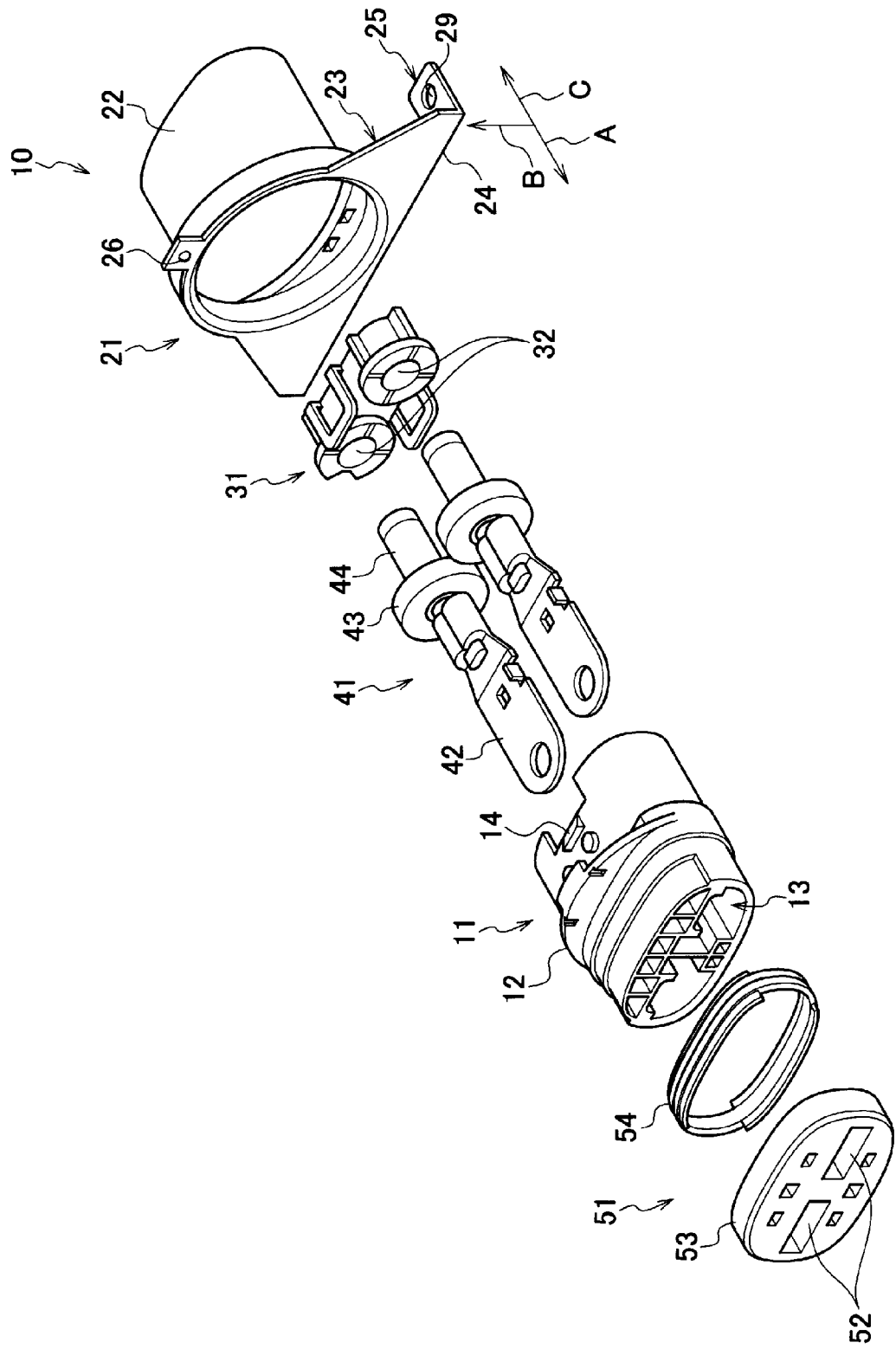
FIG. 5 is a perspective view illustrating the configuration of a shield shell connector according to an embodiment of the present invention.
Figure 6:
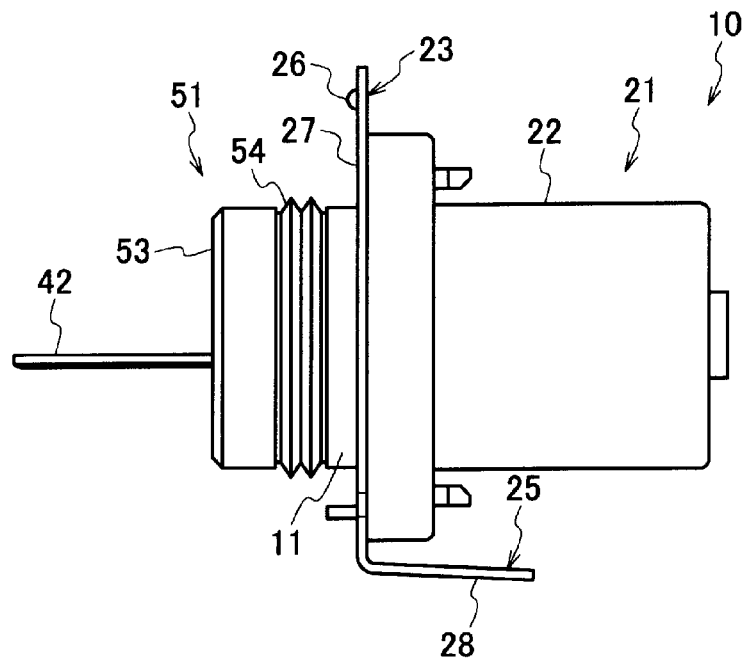
FIG. 6 is a side view illustrating a shield shell housing a connector housing according to the embodiment of the present invention.

Hereinbelow, a shield shell 21 and a shield shell attachment structure 1 according to an embodiment of the present invention will be described with reference to the drawings. FIG. 5 is a perspective view illustrating the configuration of a shield shell connector 10 according to the embodiment of the present invention. FIG. 6 is a side view illustrating the shield shell 21 housing a connector housing 11 according to the embodiment of the present invention.

Figure 7:
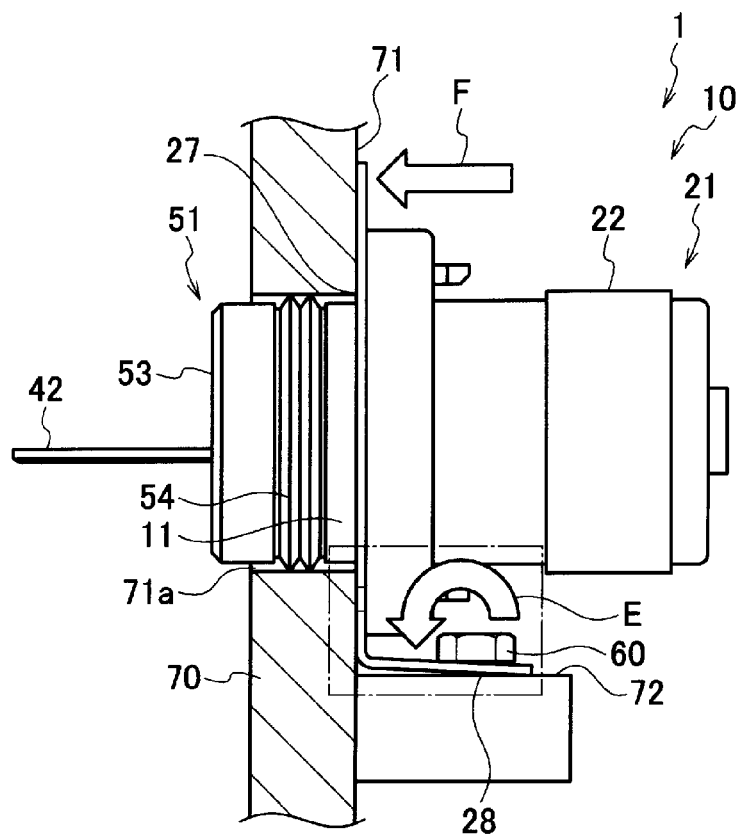
FIG. 7 is a side view illustrating the shield shell attached to an attached portion according to the embodiment of the present invention.
Figure 8:
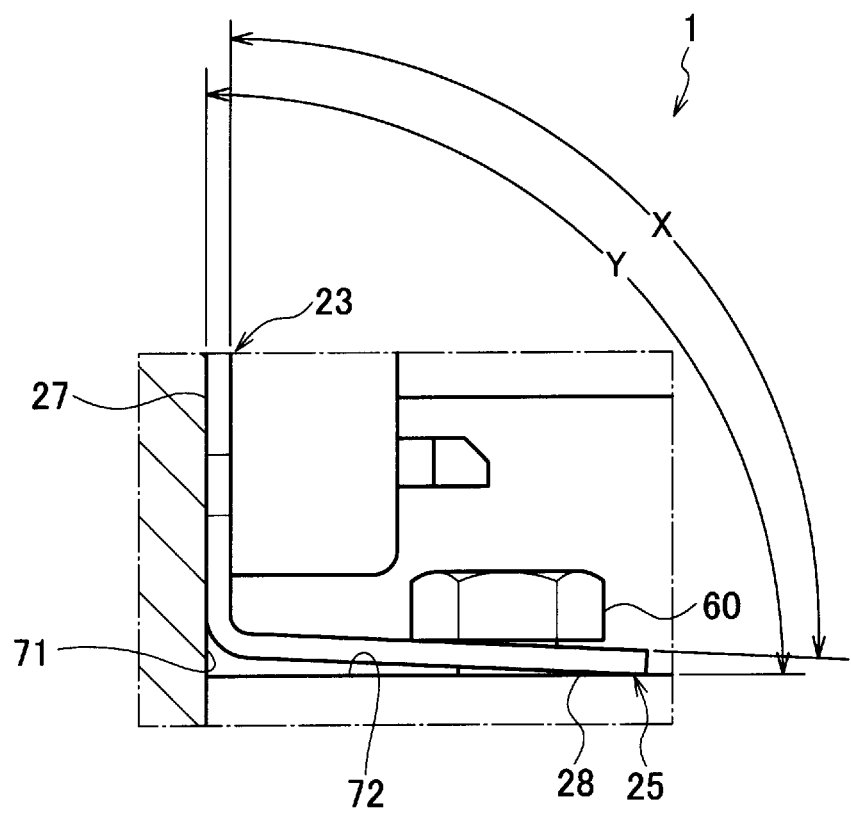
FIG. 8 is a partially enlarged view of the shield shell attached to the attached portion according to the embodiment of the present invention.

FIG. 7 is a side view illustrating the shield shell 21 attached to an attached portion according to the embodiment of the present invention. FIG. 8 is a partially enlarged view of the shield shell 21 attached to the attached portion according to the embodiment of the present invention.

The shield shell according to the embodiment of the present invention is a shield shell to be attached to an attached portion by tightening a fastening member in a state of covering a connector housing for housing a terminal to be electrically connected to an opposed terminal housed in a mating connector housing.

The shield shell attachment structure according to the embodiment of the present invention is a shield shell attachment structure including: a connector housing for housing a terminal to be electrically connected to an opposed terminal housed in a mating connector housing; a shield shell covering the connector housing; and an attached portion to which the shield shell housing the connector housing is attached with a fastening member.

As illustrated in FIGS. 5 to 8, the shield shell attachment structure 1 mainly includes: a shield shell connector 10 including the connector housing 11 and the shield shell 21; and an attached portion 70 to which the shield shell connector 10 is attached with screws (fastening members) 60.

As illustrated in FIG. 5, the shield shell connector 10 includes: the connector housing 11 functioning as a male connector housing; the shield shell 21 covering the connector housing 11; a rear holder 31 housed inside the shield shell 21; terminals 41 housed in the connector housing 11; and a front holder 51 holding the terminals 41.

The connector housing 11 includes a housing main body 12, terminal housing rooms 13, and a holding lock 14. The housing main body 12 is made of a resin and formed in a columnar shape. The terminal housing rooms 13 are formed in the housing main body 12 and respectively house terminals (terminals 41) to be electrically connected to opposed terminals (unillustrated) housed in a mating connector housing (female connector housing). The holding lock 14 is configured to be locked to the shield shell 21.

The shield shell 21 includes a shell main body 22, a first attachment piece 23, a pair of second attachment pieces 25 (one of which is unillustrated), and a projecting portion 26. The shell main body 22 houses the connector housing 11. The first attachment piece 23 is provided extending in a direction (the direction of an arrow B) crossing the direction of attachment to the attached portion 70 (the direction of an arrow A). The second attachment pieces 25 project from an end portion 24 of the first attachment piece 23. The projecting portion 26 projects in the direction of attachment to the attached portion 70 (the direction of the arrow A).

As illustrated in FIG. 6, the first attachment piece 23 has a first attachment surface 27 in contact with a first attached surface 71 (see FIG. 7 described later) of the attached portion 70, the first attached surface 71 having a connector housing insertion hole 71*a*.

As illustrated in FIGS. 5 and 6, the second attachment pieces 25 project from the end portion 24 of the first attachment piece 23 to the opposite side (see the direction of an arrow C in FIG. 5) from the first attached surface 71 side (see the direction of the arrow A in FIG. 5; see also FIG. 7 described later).

Each second attachment piece 25 has: a second attachment surface 28 in contact with a second attached surface 72 (see FIG. 7 described later) of the attached portion 70; and a screw hole (fastening hole) 29 to insert a screw 60 with which the second attachment piece 25 and the second attached surface 72 are fastened to each other.

In attaching the shield shell 21 to the attached portion 70, the second attachment surface 28 of each second attachment piece 25 is fastened to the second attached surface 72 (see FIG. 7 described later) by tightening the corresponding screw 60 in the screw hole 29.

The first attachment 23 and each second attachment piece 25 are formed integrally with each other and made of a material having a predetermined elasticity. Accordingly, when brought into contact with the first attached surface 71 and the second attached surface 72, the first attachment piece 23 and the second attachment piece 25 are elastically deformed, and their elastic restoring forces provide a contact pressure between the shield shell 21 and the attached portion 70.

As the first attachment piece 23 is brought into contact with the first attached surface 71 (see FIG. 7 described later) of the attached portion 70, the projecting portion 26 presses the first attached surface 71 in the direction of attachment to the attached portion 70 (see the direction of the arrow A in FIG. 5), thereby securing a pressure contact between the first attachment piece 23 and the first attached surface 71.

As illustrated in FIG. 5, the projecting portion 26 is provided on one side of the shield shell 21 in a direction (the direction of the arrow B) crossing the direction of attachment to the attached portion 70 (the direction of the arrow A), while the second attachment pieces 25 are provided on the other side in such a way as to project in the direction (the direction of the arrow C) opposite to the direction of attachment to the attached portion 70.

As illustrated in FIG. 5, the rear holder 31 has insertion holes 32 for supporting and fixing the terminals 41 housed in the terminal housing rooms 13 of the connector housing 11.

Each terminal (male terminal) 41 includes: a terminal portion 42 to be electrically connected to a corresponding one of the female terminals (unillustrated) housed in the mating connector housing (female connector housing, unillustrated); a rubber plug 43 in contact with a corresponding one of the insertion holes 32 in the rear holder 31; and an electric wire 44 connected to the terminal portion 42.

By contacting the insertion hole 32, the rubber plug 43 prevents water and the like from entering the space between the connector housing 11 and the electric wire 44. Moreover, the electric wire 44 is inserted in the insertion hole 32 in the rear holder 31 to support and fix the terminal 41.

The front holder 51 includes a front holder main body 53 and a packing 54. The front holder main body 53 has holding holes 52 in which the terminal portions 42 of the terminals 41 housed in the terminal housing rooms 13 of the connector housing 11 are inserted and held, respectively. The packing 54 is fitted on the connector housing 11 to prevent water and the like from entering the inside of the connector housing 11.

The packing 54 is fixed to the connector housing main body 12 by fitting the front holder 51 on the connector housing 11.

The shield shell connector 10 configured as mentioned above is assembled as follows. Specifically, as illustrated in FIGS. 5 and 6, with the terminals 41 housed in the terminal housing rooms 13 of the connector housing 11, one side of the connector housing 11 is housed in and locked to the shield shell 21 through the holding lock 14, while the other side of the connector housing 11 is fitted in the front holder 51.

Then, the connector housing 11 is inserted into the connector housing insertion hole 71*a* in the attached portion 70 described later. The connector housing 11 is also fitted to the mating connector housing (unillustrated), so that the terminals 41 housed in the terminal housing rooms 13 are connected to the terminals (unillustrated) housed in the mating connector housing.

Then, as illustrated in FIG. 7, the shield connector 10 thus assembled is fastened and attached to the attached portion 70 with the screws 60 inserted in their respective screw holes 29. Accordingly, noise leakage between the attached portion 70 and the shield shell 21 is prevented.

By fastening the second attachment surface 28 of each second attachment piece 25 to the second attached surface 72 with the screw 60 as illustrated in FIG. 7, the shield shell 21 can secure a contact pressure on the first attached surface 71 through the entire first attachment piece 23.

Further, since the second attachment surface 28 of each second attachment piece 25 can be fastened to the second attached surface 72 in a state where the second attachment surface 28 of the second attachment piece 25 is in elastic contact with the second attached surface 72, the shield shell 21 can be attached easily to the attached portion 70.

Specifically, since the fastening direction of the screws 60 is a direction (vertical direction) perpendicular to the direction of attachment to the shield shell 21 (the direction of the arrow A in FIG. 5), the screw holes 29 can be visually found easily without being blocked by the shield shell 21 and the connector housing 11. Accordingly, the workability is improved.

As described, the shield shell 21 includes the first attachment piece 23 in contact with the first attached surface 71 of the attached portion 70 having the connector housing insertion hole 71a, and the second attachment pieces 25 projecting from the end portion 24 of the first attachment piece 23 to the opposite side to the first attached surface 71 side and being in contact with the second attached surface 72 of the attached portion 70.

Accordingly, even when a hole (screw hole 29) to insert the screw 60 is provided in each second attachment piece 25, the attachment space for the screw 60 to be formed in the attached portion 70 can be secured irrespective of the thickness of the first attached surface 71 in the direction coinciding with the penetrating direction of the connector housing insertion hole 71a.

The shield shell 21 is attached to the attached portion 70 in such a way that the second attachment surface 28 of each second attachment piece 25 is in elastic contact with the second attached surface 72 in a state of exerting an elastic restoring force bringing the first attachment surface 27 of the first attachment piece 23 into pressure contact with the first attached surface 71.

Hence, the posture of the shield shell with respect to the first attached surface 71 is not changed even when the tightening forces (fastening forces) of the screws 60 are changed. That is, even when the tightening forces of the screws 60 are increased, the attached posture of the shield shell 21 with respect to the attached portion 70 is not tilted downwardly rightward in FIG. 7.

Thus, the shield shell 21 does not interfere with the connector housing 11 even when the shield shell 21 is attached to the attached portion 70 with the screws 60 in such a way that a contact pressure on the first attached surface 71 is secured by the entire shield shell 21 (the first attachment piece 23 of the shield shell 21). Accordingly, the shield shell 21 does not need to be made large.

Further, since the second attachment surface 28 of each second attachment piece 25 can be fastened to the second attached surface 72 in a state where the second attachment surface 28 of the second attachment piece 25 is in elastic contact with the second attached surface 72, the shield shell 21 can be easily attached to the attached portion 70.

As illustrated in FIG. 7, the attached portion 70 is a vertical outer wall of a shield case (unillustrated), for example, and is made of an electrically conductive metallic material. A three-phase AC motor, for example, is housed inside the shield case, and electric power is supplied to this motor from an AC/DC converter through the electric wires 44 of the terminals 41.

The attached portion 70 has the first attached surface 71 which the first attachment surface 27 of the first attachment piece 23 of the shield shell 21 comes in contact with and the second attached surface 72 which the second attachment surface 28 of each second attachment piece 25 of the shield shell 21 comes in contact with.

The attached portion 70 has the connector housing insertion hole 71a to insert the connector housing 11. The connector housing 11 housing the shield shell 21 on one side and fitted in the front holder 51 on the other side is inserted in the connector housing insertion hole 71a.

When the connector housing 11 is inserted in the connector housing insertion hole 71a, the packing 54 is fitted on the connector housing 11 and prevents water and the like from entering the inside of the connector housing 11.

As illustrated in FIG. 8, an angle (first angle) X formed between the first attachment piece 23 and each second attachment piece 25 of the shield shell 21 is set greater than an angle (second angle) Y formed between the first attached surface 71 and the second attached surface 72 of the attached portion 70.

Specifically, the first attached surface 71 of the attached portion 70 is set at a substantially right angle to the second attached surface 72, and the first attachment piece 23 of the shield shell 21 is set at an obtuse angle to each second attachment piece 25.

Hence, as illustrated in FIG. 7, when the shield shell 21 is attached to the attached portion 70, the first attachment surface 27 of the first attachment piece 23 comes into contact with the first attached surface 71, and the second attachment surface 28 of each second attachment piece 25 comes into contact with the second attached surface 72.

When the shield shell 21 is attached to the attached portion 70 and each second attachment piece 25 and the second attached surface 72 are fastened to each other by inserting the screw 60 into the screw hole 29 in the shield shell 21, the second attachment piece 25 is displaced in the direction of an arrow E, and the first attachment piece 23 is displaced accordingly in the direction of an arrow F.

Specifically, when each second attachment piece 25 and the second attached surface 72 are fastened to each other, the first attachment piece 23 is elastically deformed in such a way that its angle to the second attachment piece 25 becomes smaller than the angle X (see FIG. 8), and the attachment piece 23 is displaced in the direction of the arrow F by its elastic restoring force.

As a result, the shield shell 21 is attached to the attached portion 70 in such a way that the second attachment surface 28 of each second attachment piece 25 is in elastic contact with the second attached surface 72 in a state of exerting an elastic restoring force bringing the first attachment surface 27 of the first attachment piece 23 into pressure contact with the first attached surface 71.

As mentioned above, the angle X formed between the first attachment piece 23 and each second attachment piece 25 is set greater than the angle Y formed between the first attached surface 71 and the second attached surface 72 of the attached portion 70. Thus, the first attachment piece 23 is displaced in the direction of the arrow F, whereby a contact pressure is obtained at the projecting portion 26 of the shield shell 21.

As described, in the shield shell attachment structure 1, the shield shell 21 includes the first attachment piece 23 in contact with the first attached surface 71 of the attached portion 70 having the connector housing insertion hole 71*a*, and the second attachment pieces 25 projecting from the end portion 24 of the first attachment piece 23 to the opposite side to the first attached surface 71 side and being in contact with the second attached surface 72 of the attached portion 70.

Accordingly, even when a screw hole is provided in the first attachment piece 23 or in each second attachment piece 25, the attachment space for the screw 60 to be formed in the attached portion 70 can be secured irrespective of the thickness of the first attached surface 71 in the direction coinciding with the penetrating direction of the connector housing insertion hole 71*a* (the direction of the arrow A in FIG. 5).

The shield shell 21 is attached to the attached portion 70 in such a way that the second attachment surface 28 of each second attachment piece 25 is in elastic contact with the second attached surface 72 in a state of exerting an elastic restoring force bringing the first attachment surface 27 of the first attachment piece 23 into pressure contact with the first attached surface 71.

Hence, the posture of the shield shell with respect to the first attached surface 71 is not changed even when the tightening forces (fastening forces) of the screws 60 are changed. That is, even when the tightening forces of the screws 60 are increased, the attached posture of the shield shell 21 with respect to the attached portion 70 is not tilted downwardly rightward in FIG. 7.

Thus, the shield shell 21 does not interfere with the connector housing 11 even when the shield shell 21 is attached to the attached portion 70 with the screws 60 in such a way that a contact pressure on the first attached surface 71 is secured by the entire shield shell 21 (the first attachment piece 23 of the shield shell 21). Accordingly, the shield shell 21 does not need to be made large.

As described, the shield shell attachment structure 1 according to the embodiment of the present invention includes: the connector housing 11 housing the terminals 41 to be electrically connected to the opposed terminals housed in the mating connector housing; the shield shell 21 covering the connector housing 11; and the attached portion 70 to which the shield shell 21 housing the connector housing 11 is attached with the fastening members (screws) 60. In the shield shell attachment structure 1, the shield shell 21 includes: the first attachment piece 23 in contact with the first attached surface 71 of the attached portion 70, the first attached surface 71 having the hole 71*a* to insert the connector housing 11; and the second attachment pieces 25 projecting from the end portion 24 of the first attachment piece 23 to the opposite side to the first attached surface 71 and being in contact with the second attached surface 72 of the attached portion 70. Moreover, the first angle formed between the first attachment piece 23 and each attachment piece 25 is set greater than the second angle formed between the first attached surface 71 and the second attached surface 72. Furthermore, the shield shell 21 is attached to the attached portion 70 in such a way that the attachment surface 28 of each second attachment piece 25 is in elastic contact with the second attached surface 72 in a state of exerting an elastic restoring force bringing the attachment surface 27 of the first attachment piece 23 into pressure contact with the first attached surface 71.

In the shield shell attachment structure 1 according the embodiment of the present invention, the second attachment surface 28 of each second attachment piece 25 is fastened to the second attached surface 72 with the fastening member (screw) 60.

The shield shell 21 according to the embodiment of the present invention is to be attached to the attached portion 70 by tightening the fastening members (screws) 60 in a state of covering a connector housing 11 housing the terminals 41 to be electrically connected to the opposed terminals housed in the mating connector housing, and the shield shell 21 includes: the first attachment piece 23 having the first attachment surface 27 configured to be in contact with the first attached surface 71 of the attached portion 70, the first attached surface 71 having the hole 71*a* to insert the connector housing 11; and the second attachment pieces 25 projecting from the end portion 24 of the first attachment piece 23 to the opposite side to the first attached surface 71 and configured to be in contact with the second attached surface 72 of the attached portion 70. In the shield shell 21, the first angle formed between the first attachment piece 23 and the second attachment piece 25 is set greater than the second angle formed between the first attached surface 71 and the second attached surface 72. Moreover, in each second attachment piece 25, there is formed the fastening hole (screw hole) 29 to insert the fastening member (screw) 60 for fastening the second attachment piece 25 to the second attached surface 72.

The shield shell 21 according to the embodiment of the present invention includes the first attachment piece 23 in contact with the first attached surface 71 of the attached portion 70 having the connector housing insertion hole 71*a*, and the second attachment pieces 25 projecting from the end portion 24 of the first attachment piece 23 to the opposite side to the first attached surface 71 side and being in contact with the second attached surface 72 of the attached portion 70.

Accordingly, even when a hole (screw hole 29) to insert the screw 60 is set in each second attachment piece 25, the attachment space for the screw 60 to be formed in the attached portion 70 can be secured irrespective of the thickness of the first attached surface 71 in the direction coinciding with the penetrating direction of the connector housing insertion hole 71*a*.

The shield shell 21 is attached to the attached portion 70 in such a way that the second attachment surface 28 of each second attachment piece 25 is in elastic contact with the second attached surface 72 in a state of exerting an elastic restoring force bringing the first attachment surface 27 of the first attachment piece 23 into pressure contact with the first attached surface 71.

Hence, the posture of the shield shell with respect to the first attached surface 71 is not changed even when the tightening forces (fastening forces) of the screws 60 are changed. Thus, the shield shell 21 does not interfere with the connector housing 11 even when the shield shell 21 is attached to the attached portion 70 with the screws 60 in such a way that a contact pressure on the first attached surface 71 is secured by the entire shield shell 21 (the first attachment piece 23 of the shield shell 21). Accordingly, the shield shell 21 does not need to be made large.

Further, since the second attachment surface 28 of each second attachment piece 25 can be fastened to the second attached surface 72 in a state where the second attachment surface 28 of the second attachment piece 25 is in elastic contact with the second attached surface 72, the shield shell 21 can be easily attached to the attached portion 70.

The shield shell and the shield shell attachment structure have been described above based on the embodiment illustrated in the drawings. However, the invention is not limited to the embodiment, and the configuration of parts can be replaced with any configuration having the similar function.

For example, although the above embodiment of the present invention has been described by taking the instance where the fastening members are the screws 60, each of the fastening members may be formed of a bolt and a nut, for example.

The invention claimed is:

1. A shield shell attachment structure comprising:
a connector housing configured to house a terminal to be electrically connected to an opposed terminal housed in a mating connector housing;
a shield shell configured to cover the connector housing; and
an attached portion to which the shield shell housing the connector housing is attached with a fastening member,
wherein the shield shell includes
a first attachment piece in contact with a first attached surface of the attached portion, the first attached surface having a hole to insert the connector housing, and
a second attachment piece projecting from an end portion of the first attachment piece to an opposite side to the first attached surface and being in contact with a second attached surface of the attached portion, and
wherein the second attachment piece is fastened to the second attached surface with the fastening member so that the second attachment piece is in elastic contact with the second attached surface with an elastic restoring force bringing an attachment surface of the first attachment piece in to pressure contact with the first attached surface.

2. The shield shell attachment structure according to claim 1, wherein a first angle formed between the first attachment piece and the second attachment piece is greater than a second angle formed between the first attached surface and the second attached surface, and
the second attachment piece has a fastening hole to insert the fastening member.

3. A shield shell to be attached to an attached portion by tightening a fastening member in a state of covering a connector housing for housing a terminal to be electrically connected to an opposed terminal housed in a mating connector housing, the shield shell comprising:
a first attachment piece configured to be in contact with a first attached surface of the attached portion, the first attached surface having a hole to insert the connector housing, and
a second attachment piece projecting from an end portion of the first attachment piece to an opposite side to the first attached surface and configured to be in contact with a second attached surface of the attached portion,
wherein a first angle formed between the first attachment piece and the second attachment piece is greater than a second angle formed between the first attached surface and the second attached surface, and
wherein the second attachment piece has a fastening hole to insert the fastening member for fastening the second attachment piece to the second attached surface.

4. The shield shell attachment structure according to claim 1, wherein the first attachment piece and the second attachment piece each have a first surface and a second surface, wherein the second surface of the first attachment piece and the second surface of the second attachment piece are connected to form a first angle,
wherein the first surface of the first attachment piece contacts the first attached surface,
wherein the first attachment surface and the second attachment surface are connected to form a second angle,
wherein the first angle is greater than a second angle.

* * * * *